(12) United States Patent
Selzer (10) Patent No.: US 11,117,607 B1
(45) Date of Patent: Sep. 14, 2021

(54) HAND TRUCK FOR IRREGULAR OBJECTS (71) Applicant: Anton John Selzer, Arroyo Grande, CA (US)

(72) Inventor: Anton John Selzer, Arroyo Grande, CA (US)

(*) Notice: Subject to any disclaimer, the term of this patent is extended or adjusted under 35 U.S.C. 154(b) by 168 days.

(21) Appl. No.: 16/680,557

(22) Filed: Nov. 12, 2019

Related U.S. Application Data (60) Provisional application No. 62/767,155, filed on Nov. 14, 2018.

(51) Int. Cl.
*B62B 3/06* (2006.01)
*B62B 3/02* (2006.01)
*B62B 1/12* (2006.01)

(52) U.S. Cl.
CPC ............. *B62B 3/06* (2013.01); *B62B 1/12* (2013.01); *B62B 3/02* (2013.01)

(58) Field of Classification Search
CPC ..... B62B 1/02; B62B 1/04; B62B 1/12; B62B 1/14; B62B 1/142; B62B 3/104
See application file for complete search history.

(56) References Cited

U.S. PATENT DOCUMENTS

| | | | | |
|---|---|---|---|---|
| 4,448,434 A * | 5/1984 | Anderson | ........... | B62B 1/12 224/915 |
| 4,722,511 A * | 2/1988 | Chitwood | ........... | B62B 3/0625 254/7 R |
| 5,123,666 A * | 6/1992 | Moore | ........... | B62B 1/14 280/47.18 |
| 5,203,065 A * | 4/1993 | Peters | ........... | B25H 1/00 254/2 R |
| 5,373,593 A * | 12/1994 | Decky | ........... | B62B 3/10 254/7 R |
| 5,474,312 A * | 12/1995 | Starita | ........... | B62B 3/10 280/47.19 |
| 5,716,183 A * | 2/1998 | Gibson | ........... | B62B 1/14 414/451 |
| 6,135,466 A * | 10/2000 | Irwin | ........... | B62B 1/12 280/47.19 |
| 6,637,761 B1 * | 10/2003 | Boettcher | ........... | B62B 1/12 280/47.24 |
| 6,709,222 B2 * | 3/2004 | Inman, Jr. | ........... | B62B 1/12 280/47.18 |
| 6,752,379 B1 * | 6/2004 | Wall | ........... | B62B 5/0083 254/134 |

(Continued)

OTHER PUBLICATIONS

Genie (R) Material Lifts, Jan. 2016, http://www.metrohydraulic.com/pdf/genie-material-lifts.pdf (see p. 1, 6, 8, 11).

*Primary Examiner* — Jeffrey J Restifo
(74) *Attorney, Agent, or Firm* — Kintner IP LLC; Mary Frances Ludwig (57) ABSTRACT

A hand truck for moving an irregularly shaped object includes a rack alternately positionable between first and second use positions. In the first use position two support arms extend forwardly from the frame and in the second use position a substantially planar platform extends forwardly from the frame. The rack is adjustably positionable along the length of the frame. In embodiments, the support arms are positionable to vary the width therebetween. In other embodiments, a pivoting mechanism allows the rack to be readily positioned between the first and second use positions.

11 Claims, 6 Drawing Sheets

(56) References Cited

U.S. PATENT DOCUMENTS

| | | | | |
|---|---|---|---|---|
| 7,066,475 | B2* | 6/2006 | Barnes | B62B 1/14 |
| | | | | 280/35 |
| 7,628,406 | B1* | 12/2009 | Thomas | B62B 1/14 |
| | | | | 280/47.19 |
| 7,798,469 | B2* | 9/2010 | Junca | B62B 3/10 |
| | | | | 254/9 B |
| 7,823,862 | B2* | 11/2010 | Wakil | B62B 3/0643 |
| | | | | 254/8 R |
| 7,841,028 | B1* | 11/2010 | Rojas | A47K 17/00 |
| | | | | 4/661 |
| 8,567,796 | B2* | 10/2013 | Bar-Erez | B25H 3/023 |
| | | | | 280/47.18 |
| 8,950,732 | B2* | 2/2015 | Jordan | B62B 3/0606 |
| | | | | 254/3 R |
| 8,967,633 | B2* | 3/2015 | Drowanowski | B62B 1/26 |
| | | | | 280/47.18 |
| 9,061,777 | B2* | 6/2015 | Kotzur | B62B 3/04 |
| 9,096,248 | B2* | 8/2015 | Herb | B62B 3/10 |
| 9,132,543 | B2* | 9/2015 | Bar-Erez | B65D 43/16 |
| 9,302,892 | B1* | 4/2016 | Summit | B66F 9/18 |
| 10,214,228 | B2* | 2/2019 | Benton | B62B 3/008 |
| 10,919,553 | B2* | 2/2021 | Blevins | B62B 3/0625 |

\* cited by examiner

FIG. 13

HAND TRUCK FOR IRREGULAR OBJECTS

CROSS REFERENCE TO RELATED APPLICATION

This application claims the benefit of U.S. Provisional Application No. 62/767,155, filed 14 Nov. 2018, which is hereby incorporated in its entirety.

TECHNICAL FIELD

The present invention pertains generally to devices for lifting and transporting objects, and more particularly to a hand truck for moving an irregularly shaped object.

BACKGROUND OF THE INVENTION

Lifting and transporting irregularly shaped objects, such as toilets, often presents difficulties in gripping and stabilizing the object. Such objects may also be difficult to maneuver due to their weight. When transporting a used toilet, it is desirable to do so with as little physical contact as possible. It is also desirable to be able to easily load or unload the toilet from a truck.

It would be beneficial to be able to lift and transport a toilet or other irregularly shaped item with a single multi-functional hand truck.

BRIEF SUMMARY OF THE EMBODIMENTS

Embodiments disclosed herein are directed to a multi-functional hand truck which may be used to lift and transport large or irregularly shaped objects. The hand truck includes a rack which may be arranged in multiple positions for a variety of different use cases.

According to one or more embodiments, a hand truck for moving an irregularly shaped object includes a frame having two opposing side rails and a length oriented in the direction of a major dimension of the side rails. A pair of wheels is rotatably connected to the lower end of the frame. A rack is connected to the frame and adjustably positionable along the length of the frame. The position of the rack may be alternated between a first use position and a second use position.

In the first use position of the rack, two support arms extend forwardly from the frame and may be used to support an object. The support arms extend substantially orthogonally to a substantially planar platform, which in the first use position is oriented along the length of the frame. The platform spans the width between the side rails. In the second use position, the platform extends forwardly from the frame and may be used to support an object, while the support arms extend along the length of the frame. In this configuration the support arms may provide additional support or stability to the object being transported.

According to one or more embodiments, in the first use position the two support arms are substantially orthogonal to the major dimension of the side rails and positionable to adjust a spacing between the two support arms. In other embodiments, the two support arms are substantially parallel to one another. These features allow the arms to be adjusted to support objects of various sizes and shapes.

According to one or more embodiments, each of the side rails has an internal groove along the major dimension. The rack has two sides, and each side has a glide mounted thereto. Each glide is slidably engaged with one of the internal grooves and thereby configured to travel along the length of the frame. In this way the rack may be positioned at various heights along the frame. In some embodiments, the glides are configured to travel along the internal grooves when the rack is in either the first or second use positions.

According to one or more embodiments, when the rack is in the second use position the platform is adjustably positionable along the length of the frame to a lowermost position at least as low as the lower end of the frame. Embodiments having this features may be used to lift objects directly off of the ground.

According to one or more embodiments, the rack has two brackets, each having a slot. The hand truck includes two pegs and each peg is engaged with the slot of one of the brackets. These features allow the rack to be pivotally positioned between the first and second use positions. In the first use position the two brackets extend forwardly from the frame and each peg is positioned at a rear end of the slot. In the second use position the two brackets extend along the length of the frame and each peg is positioned at an upper end of the slot.

These and other aspects of the embodiments will be better appreciated and understood when considered in conjunction with the following description and the accompanying drawings. The following description, while indicating various embodiments and details thereof, is given by way of illustration and not of limitation. Many substitutions, modifications, additions, or rearrangements may be made within the scope of the embodiments, and the embodiments may include all such substitutions, modifications, additions, or rearrangements.

BRIEF DESCRIPTION OF THE DRAWINGS

Non-limiting and non-exhaustive embodiments of the hand truck are described with reference to the following figures, wherein like reference numerals refer to like parts throughout the various views unless otherwise specified.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. Also, common but well-understood elements that are useful or necessary in a commercially feasible embodiment are often not depicted in order to facilitate a less obstructed view of these various embodiments.

LIST OF DRAWING REFERENCE NUMERALS 20 hand truck
21 frame
22 side rail
23 lower end
24 internal groove
26 crank
28 cable
30 rack
32 support arm
34 glide
36 bracket
37 slot
38 platform
40 handle
42 wheel
44 support leg
46 foot
50 clamp
52 peg
60 pin
62 hole
64 pivot point
502 toilet
504 planter
506 benchtop

DETAILED DESCRIPTION OF THE INVENTION

Referring initially to FIGS. 1-4, there are illustrated enlarged perspective, front, top, and right side views, respectively, of an embodiment of a hand truck 20 for moving an irregularly shaped object, such as a toilet, flower pot or planter, or piece of furniture. The hand truck, which may alternately be referred to as a cart or dolly, has a frame 21 which includes two opposing side rails 22, a handle 40 at an upper end of the frame, and a pair of wheels 42 rotatably connected to a lower end 23 of the frame. A rack 30 is adjustably positionable along the length of the frame, where the length corresponds to the major dimension of the side rails indicated as direction 'L' in FIG. 4.

The rack includes two support arms 32 and a substantially planar platform 38 arranged substantially orthogonal to support arms 32. The position of rack 32 may be alternated between a first use position, shown in FIGS. 1-4, and a second use position shown in FIGS. 6-9 and discussed below.

As used herein the terms "forward", "rearward", and the like refer to the perspective of an operator positioned behind the upright frame and facing the handle. While the hand truck may be operated or stored in a variety of positions, the terms "vertical" and "horizontal" as used herein refer to the hand truck orientation of FIG. 4, where dimension 'L' extends in a vertical direction.

Figure 11:
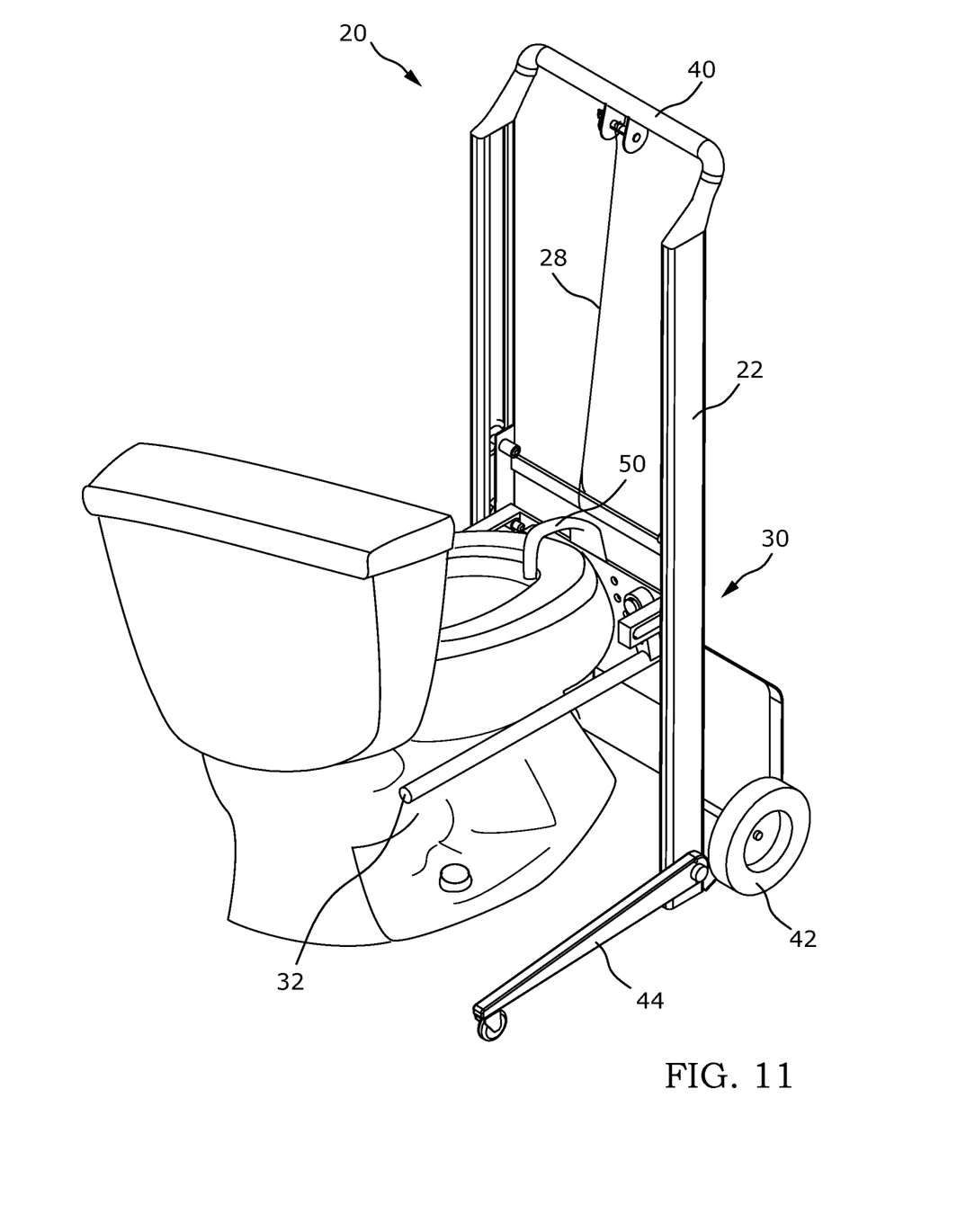
FIG. 11 is a view of an embodiment of the hand truck in a first use position.

In the first use position support arms 32 extend forwardly from frame 21 in a generally horizontal orientation (i.e., substantially orthogonal to major dimension L of side rails 22). In this way, support arms 32 are configured to be positioned on opposing sides of an object which is narrower than frame 21, such as a toilet 502 or a planter 504 (see FIGS. 11-12). Support arms 32 are positionable to adjust the spacing therebetween, as indicated by the alternate positions of arms 32 shown in broken lines in FIGS. 2-3. The mechanism of adjustment is discussed in detail below. When rack 30 is in the first use position, platform 38 extends substantially vertically along the length of the frame. In embodiments, platform 38 contacts rails 22 providing additional support for arms 32.

Figures 12, 13:
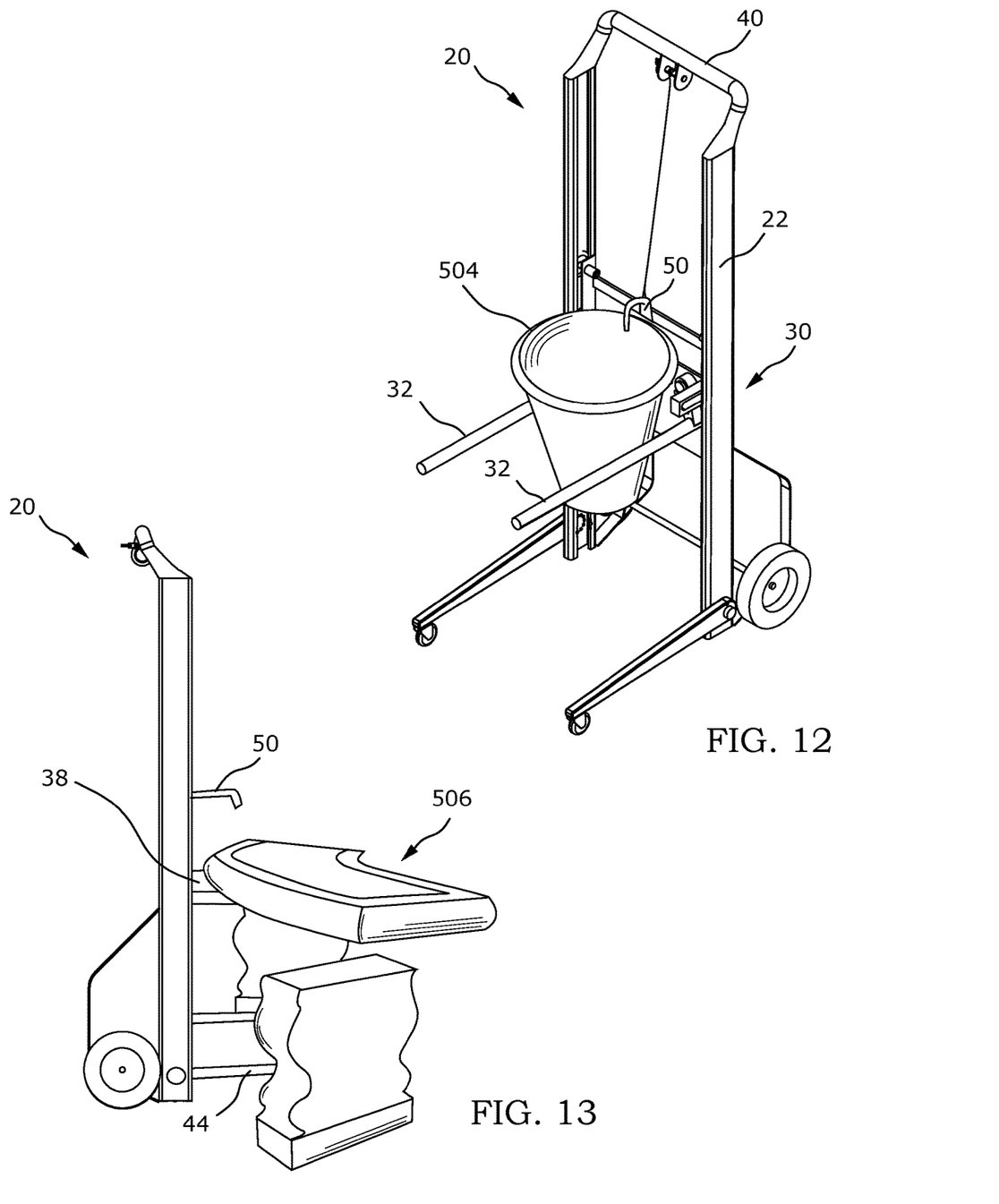
FIG. 12 is another view of an embodiment of the hand truck in the first use position.
FIG. 13 is a view of an embodiment of the hand truck in a second use position.

FIGS. 6-9 show enlarged perspective, front, top, and left side views, respectively, of hand truck 20 in the second use position. In the second use position platform 38 extends forwardly from frame 21 in a generally horizontal orientation. Hand truck 20 may be used to raise, lower, or transport an irregularly shaped object supported on platform 38, such as a bench top 506 as shown in FIG. 13. In embodiments, platform 38 spans substantially the entire width between side rails 22 (e.g., the width between the side rails less adequate clearance for smooth vertical travel of the platform). In the second use position, support arms 32 are vertically oriented (i.e., along length L of frame 21), and are shown in FIGS. 6-9 pointing upwardly and folded toward the rear of hand truck 20. In this position arms 32 provide stability to platform 38.

Figure 2:
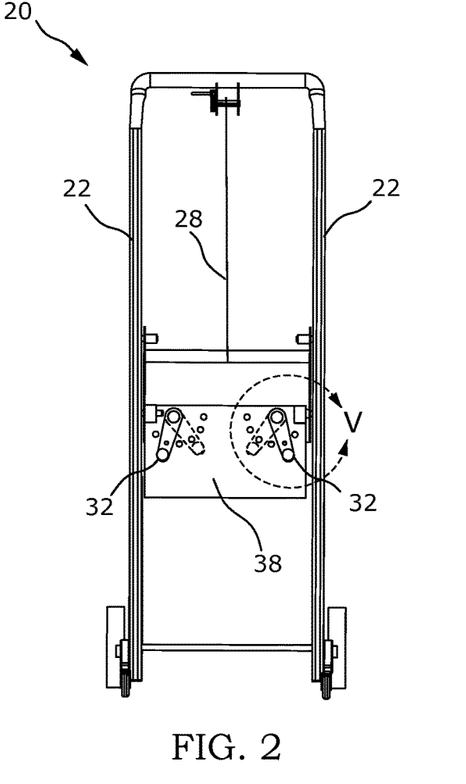
FIG. 2 is a front view thereof.
Figure 3:
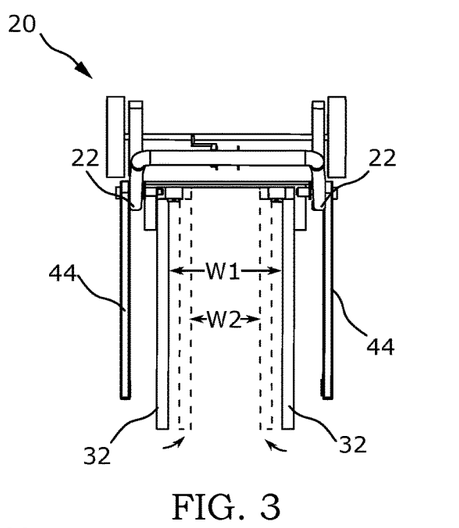
FIG. 3 is a top view thereof.
Figure 4:
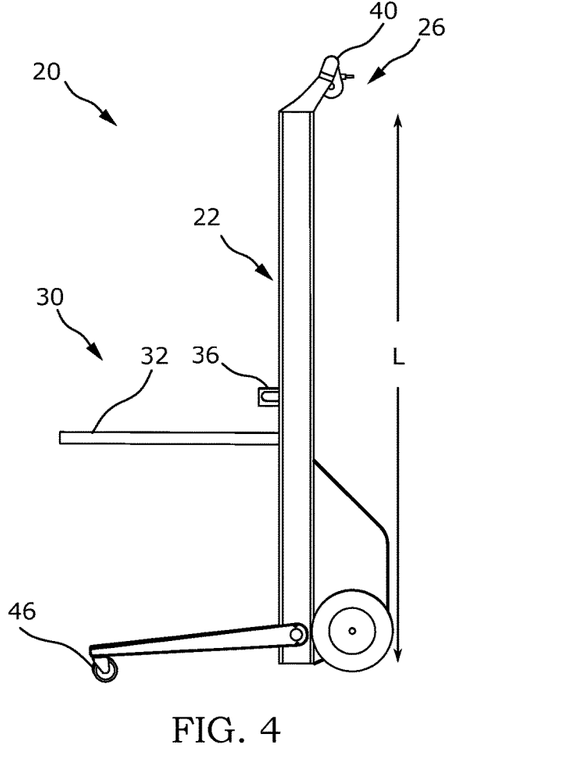
FIG. 4 is a right side view thereof, the left side view being substantially a mirror image.
Figure 5:
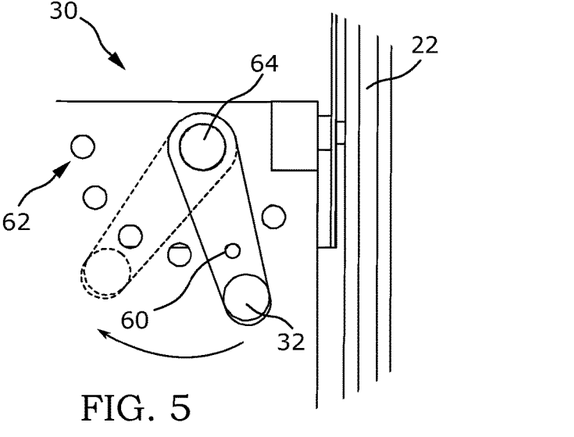
FIG. 5 is an enlarged view of area V of FIG. 2.
Figure 6:
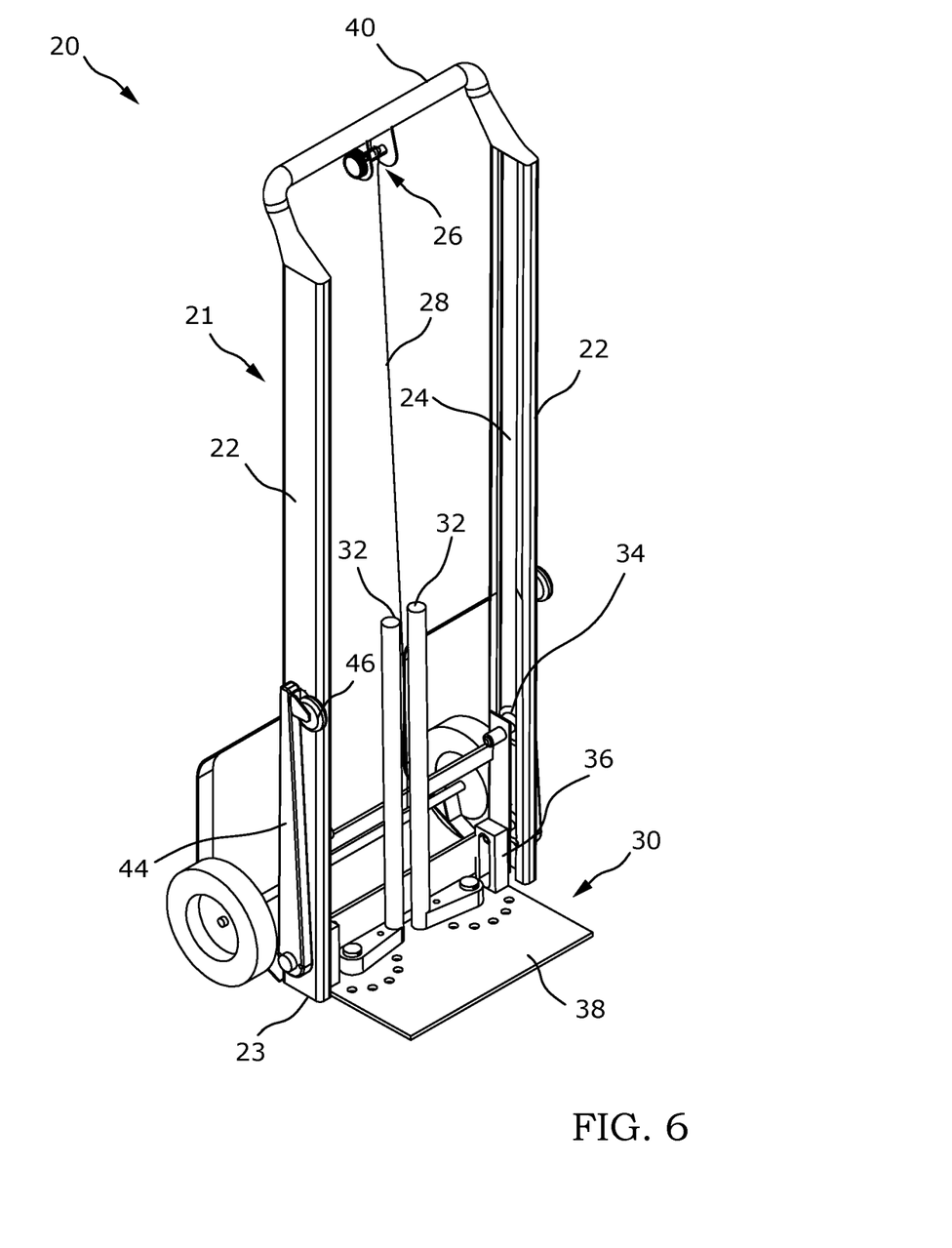
FIG. 6 is an enlarged perspective view of the hand truck in a second use position.
Figure 7:
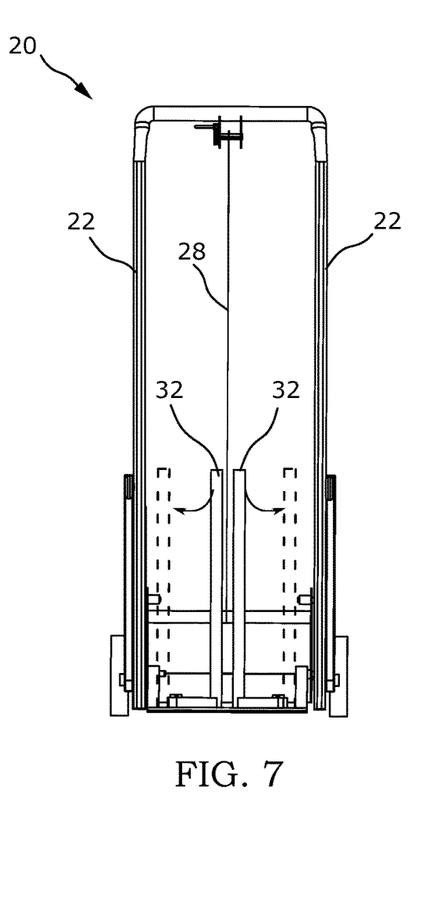
FIG. 7 is a front view thereof.
Figure 8:
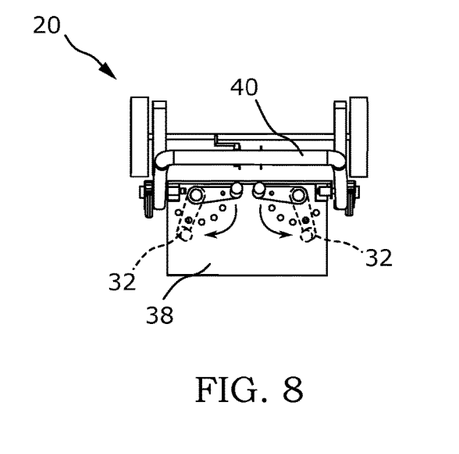
FIG. 8 is a top view thereof.
Figure 9:
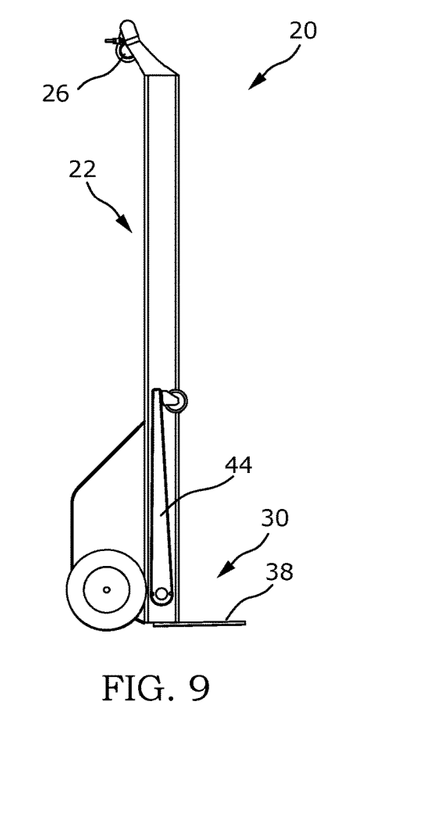
FIG. 9 is a left side view thereof, the right side view being substantially a mirror image.

FIG. 5 is an enlarged view of area V of FIG. 2. Rack 30 includes a mechanism for lateral adjustment of support arms 32 (i.e., adjustment of the width between the support arms). Possible alternate positions of arms 32 are shown in FIG. 5 in solid and broken lines (see also FIGS. 2, 3, 7, 8). In the FIG. 5 embodiment, each arm includes a pin 60 which may be located in any one of a plurality of holes 62 by pivoting the arm about pivot point 64 and locking the arm into position with pin 60.

The pattern of holes 62 allows each arm 32 to be positioned in numerous discrete locations which is useful for securely gripping objects of different widths between the support arms. For example, arms 32 may be positioned nearer side rails 22 to provide a first width W1 for supporting an irregular object (see FIG. 3). Positioning arms further inwardly may provide a second, narrower width W2. The arm position of W1 also positions the arms lower on rack 30, which may be advantageous for lifting objects from at or near ground level. In the alternate position of FIGS. 7 & 8, arms 32 may be positioned forwardly on platform 38 and may be used to assist in supporting the object being transported (e.g., a strap may be tied around each arm and the object to help secure the object to the rack).

It will be understood that a variety of widths between arms 32 may be provided with the illustrated mechanism. In addition, more or fewer holes 62 may be provided. In embodiments, pin 60 may be a clevis pin, a quick-release pin, a threaded rod or bolt, or other repositionable fastener known in the art. Pin 60 may lock into position in the selected hole 62.

In alternative embodiments of the hand truck, support arms 32 may be positionable within a guide channel or indexed slot. The position of arms 32 along the width may be continuously variable, such as by guiding the arms into position within a channel using a worm gear configured to drive a worm coupled to each arm. In some embodiments, support arms 32 remain substantially parallel to one another regardless of the width between them.

In both the first and second use positions rack 30 may be positioned along the length of frame 21 to set the rack to different heights and raise or lower objects. In the embodiment of FIGS. 1-4, rack 30 is raised or lowered by operation of a crank 26, shown mounted to handle 40. Crank 26 is connected to rack 30 by a cable 28. For example, rack 38 may be moved between the positions shown in solid and broken lines along the directional arrows of FIG. 1. The shown crank 26 is a manual crank (driven by hand), but the crank may be motorized if desired. In other embodiments lifting the rack may be accomplished by mechanisms other than a crank, for example, a machine screw such as those commonly used in jacks, a pneumatic lift, or the like.

Side rails 22 each have an internal groove 24 with which rack 30 is slidably engaged. Internal grooves 24 extend along a portion or the entirety of the length of side rails 22. The rack has at least one glide 34 on each side, the glides of the shown embodiment being wheels. Glides 34 slidably engage with internal grooves 24; in other words, when engaged with the grooves, the glides are permitted to travel smoothly along the length of the rail.

In the shown embodiments, rack 30 is positionable along the length of frame 21 by the above described method when rack 30 is in either of the first or second use positions. In embodiments, when rack 30 is in the second use position platform 38 may be positioned to a lowermost position which is at least as low as lower end 23 of frame 21. This configuration allows platform 38 to be used for moving objects directly from the ground in a manner similar to a conventional hand truck. In embodiments, the range of travel of rack 30 along frame 21 is from at or near ground level to at least a height sufficient for loading a lifted object onto a truck.

Figure 1:
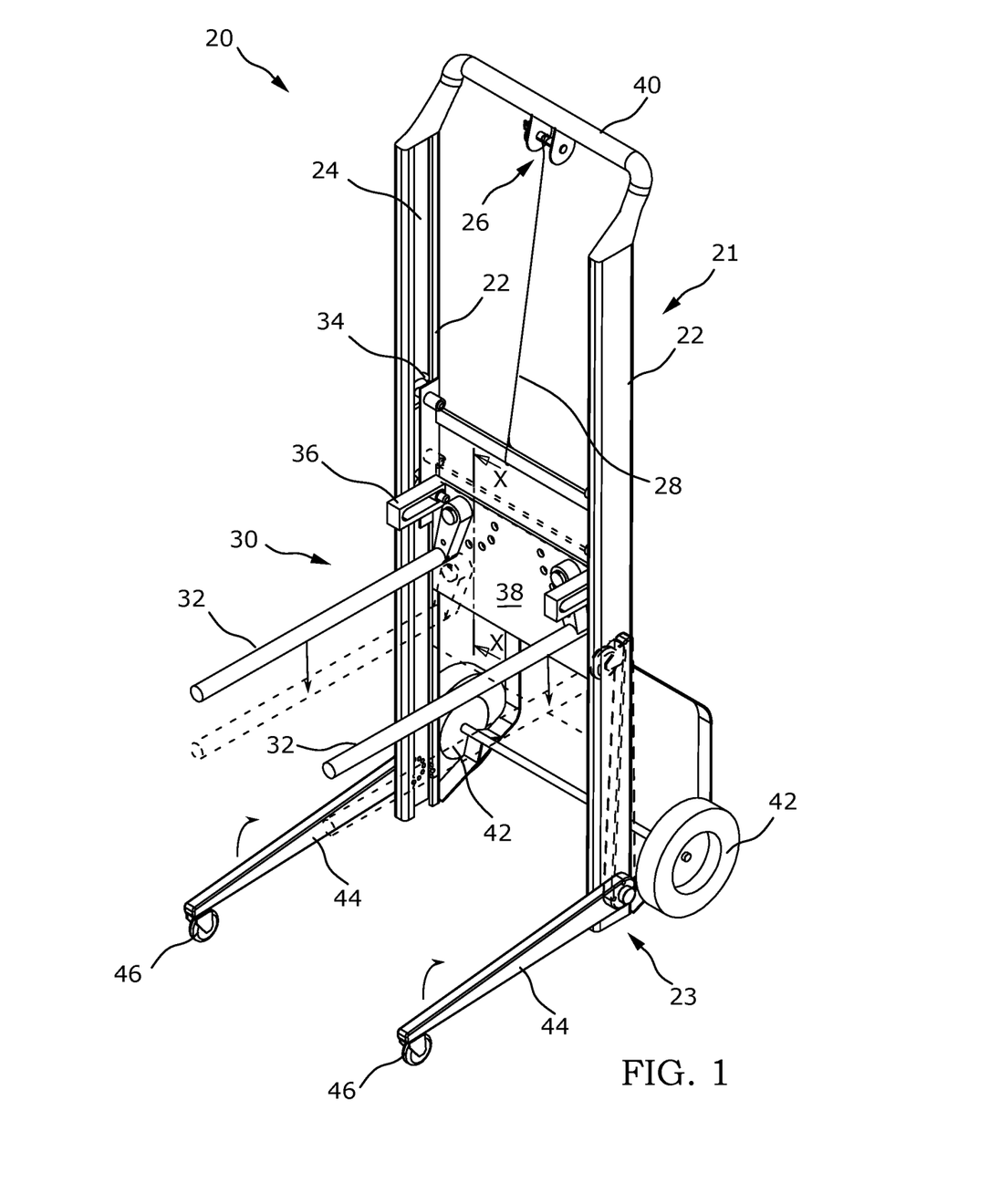
FIG. 1 is an enlarged perspective view of an embodiment of a hand truck in a first use position.
Figures 10A, 10B:
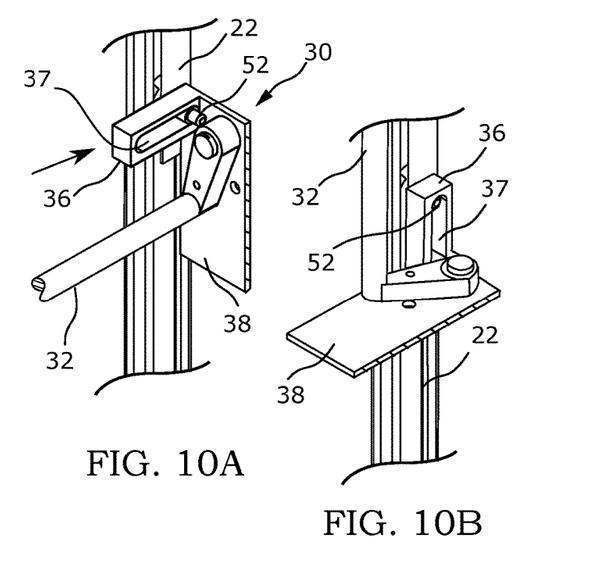
FIGS. 10A & 10B are enlarged fragmented views along the line X-X of FIG. 1.

FIGS. 10A & 10B are enlarged fragmented views along the line X-X of FIG. 1, illustrating an example mechanism for positioning rack 30 in first and second use positions. Views of the opposite side of the rack are substantially mirror images of the provided views. In the shown embodiment, rack 30 has a bracket 36 on each side proximate side rail 22. A slot 37 in bracket 36 engages a peg 52. When the rack is positioned such that brackets 36 extend forwardly from the frame and each peg 52 is located at a rear end of slot 37, the rack is arranged in the first use position, with support arms 32 projecting forwardly (see FIG. 10A). By sliding the rack backward along the directional arrow to locate peg 52 at the forward end of slot 37, the rack may be moved about 90 degrees from the first use position to the second use position (FIG. 10B).

Rack 30 is held in the second use position by gravity. A locking mechanism may be provided to prevent inadvertent movement of the rack along slot 37 when the rack is in the first use position. For example, peg 52 may be provided with a fastening thumbscrew or locking pin. In other embodiments, peg 52 is a simple dowel.

Referring again to FIGS. 11-13, hand truck 20 may have an adjustable clamp 50 for use in securing the object being transported. In embodiments, hand truck 20 includes two support legs 44, which may be collapsible. Support legs 44 are shown extended in FIGS. 1-4 and folded against side rails 22 in FIGS. 6-9. Embodiments of the support legs have feet 46, which may be wheels. The support legs improve the balance of the hand truck when used to lift objects with the side arms, and the wheels improve mobility.

Embodiments of the hand truck may include additional features, such as a drip pan positionable between side rails 22 and underneath an objects being lifted; or additional shelves or hooks removably attachable to the rack or to side rails 22.

In terms of use, a method of moving an irregularly shaped object (e.g, 502, 504, 506) includes: (refer to FIGS. 1-13)
(a) providing a hand truck 20 including:
a frame 21 having two opposing side rails 22 and a length 'L' oriented in the direction of a major dimension of the side rails;
a pair of wheels 42 rotatably connected to a lower end 23 of the frame;
a rack 30 adjustably positionable along the length of the frame, the rack including a substantially planar platform 38 spanning a width between the side rails, and two support arms 32 extending substantially orthogonal to the platform;
the rack alternately positionable between a first use position and a second use position;
wherein in the first use position the two support arms extend forwardly from the frame and the platform extends along the length of the frame; and
wherein in the second use position the platform extends forwardly from the frame and the support arms extend along the length of the frame;
(b) positioning the rack into the first use position;
(c) positioning the hand truck such that the support arms support the irregularly shaped object; and
(d) moving the hand truck, thereby moving the irregularly shaped object.

The method further including, alternately positioning the rack between the first use position and the second use position.

The method further including:
in (a), the hand truck further including:
each of the side rails having an internal groove along the major dimension; and
the rack having two sides, each side having a glide mounted thereto, and each glide slidably engaged with of the internal grooves and thereby configured to travel along the length of the frame; and
before (c), moving the rack along the length of the frame.

The method further including:
in (a), when the rack is in the first use position the two support arms being substantially orthogonal to the major dimension of the side rails; and
before (c), positioning the two support arms to adjust a spacing therebetween.

The embodiments of the hand truck and method of use described herein are exemplary and numerous modifications, combinations, variations, and rearrangements can be readily envisioned to achieve an equivalent result, all of which are intended to be embraced within the scope of the appended claims. Further, nothing in the above-provided discussions of the hand truck and method should be construed as limiting the invention to a particular embodiment or combination of embodiments. The scope of the invention is defined by the appended claims.

I claim:

1. A hand truck for moving an irregularly shaped object, the hand truck comprising:
a frame having two opposing side rails and a length oriented in the direction of a major dimension of the side rails;
a pair of wheels rotatably connected to a lower end of the frame;
a rack adjustably positionable along the length of the frame, the rack including a substantially planar platform spanning a width between the side rails, and two support arms extending substantially orthogonal to the platform;
the rack alternately positionable between a first use position and a second use position;
wherein in the first use position the two support arms extend forwardly from the frame and the platform extends along the length of the frame; and wherein in the second use position the platform extends forwardly from the frame and the support arms extend along the length of the frame.

2. The hand truck according to claim 1, wherein in the first use position the two support arms are substantially orthogonal to the major dimension of the side rails and positionable to adjust a spacing between the two support arms.

3. The hand truck according to claim 2, wherein the two support arms are substantially parallel to one another.

4. The hand truck according to claim 1, further including:
   each of the side rails having an internal groove along the major dimension; and
   the rack having two sides, each side having a glide mounted thereto, and each glide slidably engaged with one of the internal grooves and thereby configured to travel along the length of the frame.

5. The hand truck according to claim 4, wherein the glides are configured to travel along the internal grooves when the rack is in the first use position and when the rack is in the second use position.

6. The hand truck according to claim 1, wherein when the rack is in the second use position the platform is adjustably positionable along the length of the frame to a lowermost position at least as low as the lower end of the frame.

7. The hand truck according to claim 1, further including:
   the rack having two brackets, each bracket having a slot therethrough;
   two pegs, each peg engaged with the slot of one of the brackets;
   wherein in the first use position the two brackets extend forwardly from the frame and each peg is positioned at a rear end of the slot; and
   wherein in the second use position the two brackets extend along the length of the frame and each peg is positioned at an upper end of the slot.

8. A method of moving an irregularly shaped object, the method comprising:
   (a) providing a hand truck, the hand truck including:
      a frame having two opposing side rails and a length oriented in the direction of a major dimension of the side rails;
      a pair of wheels rotatably connected to a lower end of the frame;
      a rack adjustably positionable along the length of the frame, the rack including a substantially planar platform spanning a width between the side rails, and two support arms extending substantially orthogonal to the platform;
      the rack alternately positionable between a first use position and a second use position;
      wherein in the first use position the two support arms extend forwardly from the frame and the platform extends along the length of the frame; and
      wherein in the second use position the platform extends forwardly from the frame and the support arms extend along the length of the frame;
   (b) positioning the rack into the first use position;
   (c) positioning the hand truck such that the support arms support the irregularly shaped object; and
   (d) moving the hand truck, thereby moving the irregularly shaped object.

9. The method according to claim 8, further including:
   alternately positioning the rack between the first use position and the second use position.

10. The method according to claim 8, further including:
    in (a), the hand truck further including:
       each of the side rails having an internal groove along the major dimension; and
       the rack having two sides, each side having a glide mounted thereto, and each glide slidably engaged with of the internal grooves and thereby configured to travel along the length of the frame; and
    before (c), moving the rack along the length of the frame.

11. The method according to claim 8, further including:
    in (a), when the rack is in the first use position the two support arms being substantially orthogonal to the major dimension of the side rails; and
    before (c), positioning the two support arms to adjust a spacing therebetween.

\* \* \* \* \*